A. L. LIBBEY.
POTATO-DIGGER.

No. 181,191.  Patented Aug. 15, 1876.

Witness
W. E. Brown
Jacob Stern

Inventor
Albert L. Libbey
By Franklin Haney Atty.

UNITED STATES PATENT OFFICE.

ALBERT L. LIBBEY, OF EXETER, MAINE, ASSIGNOR TO HIMSELF AND GEORGE S. HILL, OF SAME PLACE.

IMPROVEMENT IN POTATO-DIGGERS.

Specification forming part of Letters Patent No. 181,191, dated August 15, 1876; application filed June 21, 1876.

*To all whom it may concern:*

Be it known that I, ALBERT L. LIBBEY, of Exeter, in the county of Penobscot and State of Maine, have invented certain new and useful Improvements in Potato-Diggers; and I do hereby declare that the following is a full, clear, and exact description thereof, that will enable others skilled in the art to which it appertains to make and use the same, reference being had to the accompanying drawings, forming a part of this specification, in which—

Figure 2:
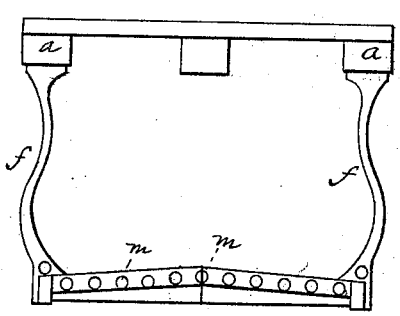
Figure 3:
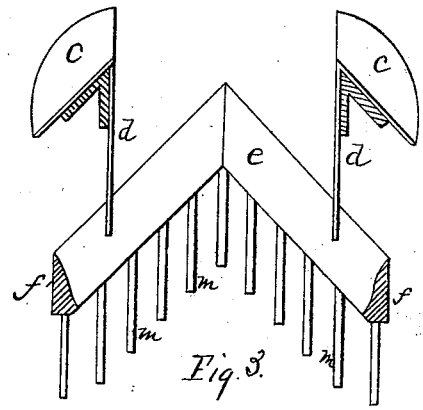
Figure 1:
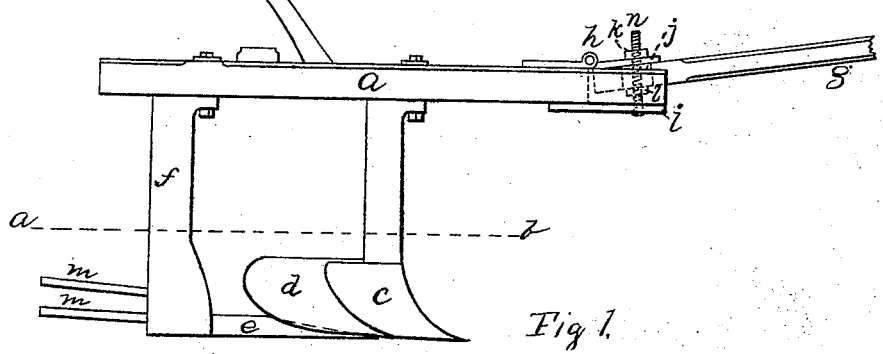

Figure 1 shows a side elevation; Fig. 2, a rear view of digger and supports; Fig. 3, section through $a\ b$.

Same letters show like parts.

My invention consists of a potato-digger, simple and cheap in construction, and having improved devices for regulating the draft, and for guiding the potatoes and soil upon the digger and separator.

Referring to the drawing will best illustrate my invention. At $a$ is shown the frame of the machine, properly braced and strengthened, and provided with guiding-handles $b\ b$. On each side of the frame are plowshares $c\ c$, so constructed as to cut on each side of the hill, throwing the earth outwardly. On the inner sides of the shares are guide-boards $d\ d$, parallel with each other, and guiding the earth back upon a triangular-shaped digger, $e$, which is attached to the frame behind the shares $c\ c$ by supports $f\ f$, which curve outwardly, as shown, in order to allow the earth to spread. Secured to the rear of the digger are the horizontal or slightly-inclined teeth $m$, forming the separator.

My device for regulating the draft of the machine consists in making the tongue $g$, to which the draft-animals are attached, separate from the frame $a$ of the machine, and connecting it thereto by a hinge, $h$, allowing a vertical adjustment just below the tongue. Upon the frame is a plate, $i$, in which is fixed a screw-bolt, $n$, passing up through a slot, $j$, in the tongue. Nuts $k\ l$ are placed on this bolt, one above and one below the tongue, the elevation of which is changed by varying the position of the nuts on the bolt, the tongue being held between them. The draft of the digger is increased by raising the tongue and diminished by dropping it.

What I claim as my invention, and desire to secure by Letters Patent, is—

A potato-digger consisting of the following parts, to wit: A frame, $a$, triangular digger $e$, separator $m$, formed by parallel rods, projecting from said digger toward the rear of the machine, shares $c\ c$, curved upon their outer surfaces, and provided with parallel guide-boards $d\ d$ upon their inner sides, and adjustable tongue $g$, hinged, as described, to the frame $a$, all said parts being constructed, combined, and arranged in the manner and for the purposes set forth.

In testimony that I claim the foregoing I have hereunto set my hand this 15th day of June, 1876.

ALBERT L. LIBBEY.

Witnesses:
 JOHN R. MASON,
 WM. FRANKLIN SEAVEY.